US006785752B2

(12) United States Patent
Gerhart

(10) Patent No.: US 6,785,752 B2
(45) Date of Patent: Aug. 31, 2004

(54) METHOD FOR DYNAMICALLY ADJUSTING BUFFER UTILIZATION RATIOS IN A HARD DISK DRIVE SYSTEM

(75) Inventor: Darin Edward Gerhart, Rochester, MN (US)

(73) Assignee: International Business Machines Corporation, NY (US)

( * ) Notice: Subject to any disclaimer, the term of this patent is extended or adjusted under 35 U.S.C. 154(b) by 545 days.

(21) Appl. No.: 09/816,161

(22) Filed: Mar. 23, 2001

(65) Prior Publication Data

US 2002/0138692 A1 Sep. 26, 2002

(51) Int. Cl.[7] .................................................. G06F 3/00
(52) U.S. Cl. ........................... 710/56; 711/112; 710/60
(58) Field of Search .......................... 711/111, 112, 113, 711/154, 170; 710/22, 56, 60, 29

(56) References Cited

U.S. PATENT DOCUMENTS

| | | | | |
|---|---|---|---|---|
| 4,613,954 A | | 9/1986 | Sheth | |
| 5,210,829 A | * | 5/1993 | Bitner | 710/57 |
| 5,261,058 A | | 11/1993 | Squires et al. | |
| 5,276,662 A | * | 1/1994 | Shaver et al. | 711/4 |
| 5,412,780 A | * | 5/1995 | Rushton | 711/113 |
| 5,507,005 A | * | 4/1996 | Kojima et al. | 710/52 |
| 5,812,754 A | | 9/1998 | Lui et al. | 395/182.04 |
| 5,978,868 A | | 11/1999 | Maas | 710/52 |
| 5,999,995 A | | 12/1999 | Ueno et al. | |
| 6,000,020 A | | 12/1999 | Chin et al. | 711/162 |
| 6,057,863 A | | 5/2000 | Olarig | 345/520 |
| 6,092,128 A | | 7/2000 | Maas et al. | 710/57 |
| 6,101,619 A | | 8/2000 | Shin | |
| 6,209,046 B1 | | 3/2001 | Sato et al. | |

* cited by examiner

Primary Examiner—Matthew Kim
Assistant Examiner—H. B. Patel
(74) Attorney, Agent, or Firm—Moser, Patterson & Sheridan, LLP

(57) ABSTRACT

A method, which may be embodied upon a computer readable medium and executed by a processor, for dynamically adjusting engine startup parameters for a hard disk drive system. The method includes determining if a drive catch-up condition or a host catch-up condition has occurred and adjusting at least one of a read pad and a write pad if a drive catch-up condition is determined. The method further calculating a pad parameter and an optimal delay parameter if a host catch-up condition is determined. Thereafter, the method includes adjusting the optimal delay parameter with the pad parameter if a host catch-up condition is determined.

12 Claims, 10 Drawing Sheets

METHOD FOR DYNAMICALLY ADJUSTING BUFFER UTILIZATION RATIOS IN A HARD DISK DRIVE SYSTEM

BACKGROUND OF THE INVENTION

1. Field of the Invention

The present invention relates to adjustment of buffer parameters in a hard disk drive system.

2. Background of the Related Art

Conventional hard disk drives generally include two individual data transfer engines configured to cooperatively move data into and out of a hard disk drive storage medium, as shown in FIG. 1. The first of the two engines, typically referred to as the drive side engine 101, is generally responsible for transferring data between a memory buffer 102, which may be a bank of dynamic random access memory (DRAM), and the magnetic media 100 of the hard disk drive. The second of the two engines, typically referred to as the host side engine 103, is responsible for transferring data between the memory buffer 102 and a host interface 104. The host interface 104 may be, for example, an advanced technology attachment interface (ATA), a small computer systems interface (SCSI and/or scuzzy), fiber channel arbitrated loop (FC-AL), and/or another known interface configurations. The first and second engines generally operate independently of each other, but often operate to transfer data into and out of the memory buffer 102 simultaneously. Additionally, the first and second engines often operate at different data transfer speeds, as host-type interfaces often operate in the 1 to 2 gigabit range, while the interface between a hard disk drive and a memory are traditionally much slower, generally in the range of 20 to 60 megabytes.

In an operation to read data from the hard disk drive, for example, when a device requests information residing on the hard disk drive, the drive side engine 101 generally operates to transfer the requested data from the storage medium 100 of the hard disk drive to the memory buffer 102. After a predetermined period of time has passed, the host engine 103 will generally begin moving data transferred to the memory buffer 102 by the drive side engine 101 to the host interface 104 for distribution to the device requesting the data from the hard disk drive. It is important that the host side wait before initiating data transfer, as the host side is generally capable of transferring data at a substantially faster rate. Therefore, the host is capable of rapidly catching up to the drive side, which results in performance delays, as the host side engine must then be temporarily disabled in order to allow the drive side transfer more data for the host side to process/transfer. After the drive side initiates data transfer, it will eventually complete the transfer of the requested information from the medium of the hard disk drive to the memory buffer. At some time after drive side engine initiates data transfer, host side engine starts transfer and eventually completes transfer of the requested data from the memory buffer to the host interface. Once the host side engine completes the transfer of data from the memory buffer to the host interface, the data transfer process for that particular read operation is generally complete. However, in a typical hard disk drive configuration, there are generally multiple individual segments of data transferred in order to complete a single transfer command, and therefore, the host side may regularly catch up to the drive side at the end of each data segment transfer. These end of segment-type catch-up conditions may generally be referred to as desired catch-up conditions, and are expected to continue until the segments are collectively transferred, thus completing the individual transfer command.

A similar operation is conducted for writing data to the hard disk drive, however, the data flow and respective engine handling is essentially reversed. Therefore, when a device is to write data to the hard disk drive, the host side engine generally begins to transfer the portion of data to the memory buffer from the host interface, for example, a segment of data. The memory buffer will begin to fill up with the data to be written, and therefore, at some predetermined time thereafter, which is generally as quickly as possible, the drive side engine begins to transfer data into the drive storage medium for storage thereon. Both engines may simultaneously transfer data to and from the memory buffer until the data is completely transferred to the hard disk drive. This simultaneous transfer operation generally occurs in segments or blocks, in similar fashion to the above noted read operation. However, drive side catch-up conditions are generally much less frequent than host side catch-up conditions, as the performance penalty associated with a drive side catch-up is substantially greater than a host side, and is therefore to be avoided. In this configuration the host side engine generally completes data transfer operations prior to the data side engine.

However, since the drive and host side engines generally operate at different data transfer rates, one engine may "catch-up" to the other engine during a data transfer operation, irrespective of the direction of the data transfer. In this situation, the transfer operations of engine that has caught up must be halted, and the engine must wait until the other engine has transferred additional data, i.e., caught up, before the halted engine can reinitiate and continue its own data transfer operations. If the host side engine catches up to the drive side engine, then the catch-up condition is generally referred to as a host catch-up. Alternatively, if the drive side engine catches up to the host side engine, then the catch up condition is generally referred to as a drive catch-up. Both of these conditions are detrimental to the efficiency and performance of the hard disk drive and the surrounding components/devices, as each time a catch-up event occurs, an efficiency/performance penalty is incurred, as the respective engine is halted while the software intervenes to calculate when the engine may be subsequently restarted.

On hard disk drives in particular, drive catch-up conditions have a substantial performance penalty, as it requires one complete revolution of the hard disk storage medium before access to the storage medium may be reinitiated at the same location at which the previous data read/write was stopped. For example, on a 10,000 revolution per minute disk drive, the timing penalty for waiting for the drive medium to complete a single revolution to return to the point on the drive at which the drive medium was halted would be at least 6 milliseconds. Although host catch-up penalties are typically smaller than drive catch-up penalties and depend primarily upon the specific type of interface used, host catch-up penalties nevertheless also contribute to decreased system performance. In a fiber channel arbitrated loop configuration (FC-AL), for example, the halt/wait time penalty generally amounts to the time required to re-arbitrate for the loop. However, on large loops or public loops, the wait time penalty can be significantly increased and become a substantial factor in decreased system performance. Both types of catch-up conditions generally require software intervention to halt and/or reinitiate the respective transfer engine. As a result thereof, both catch-up conditions require allocation of valuable processor cycles, which reduces the number of processor cycles available for other devices and tasks, such as, for example, command reordering.

In view of the performance degradation resulting from catch-up conditions, it is desirable to have a logical structure and/or controlling-type software for hard disk drives that is configured to avoid catch-up conditions and to optimize the host side engine usage so as to reduce the number of times it must be re-started. Some conventional scuzzy-type devices attempt to accomplish this task via allowing users selective control over when the host side engine initiates data transfer. This selective control is generally based upon timing of the host engine's initialization of data transfer with respect to the drive side engine. This timing is generally based upon the size of the intermediately positioned memory buffer and the transfer speeds of the respective engines. In particular, conventional devices may allow users to set the Read Full Ratio in Mode Page 2 for read commands. This ratio generally represents a fraction that indicates how full the drive buffer should be before host data starts getting transferred out of the buffer, i.e., 40% or 80%, for example. There is also a corresponding Write Empty Ratio parameter, which represents how empty the buffer should be before the drive engine should request more data to be written thereto, that can be specified for write commands. These are fixed ratios that a sophisticated customer may be able to use in order to maximize loop performance for case specific tasks under very specific conditions. However, the manipulation of these parameters requires that the user have substantial understanding of the respective system and that the respective system has a predictable and relatively constant loop response. However, if system conditions change, as they often do, then the fixed ratios are no longer appropriate and must be recalculated by the user, which may be a substantial task. As an alternative to manually manipulating these parameters, the user may allow the hard disk drive to determine when to start the host side engine in reference to the drive side engine by setting one or both of the Read Full Ratio and Write Empty Ratio to zero. This is generally referred to in the art as using an "adaptive ratio," which indicates that a consistent value is used to adjust the engine start times. This value remains constant during operation and is not adjusted for system changes.

For example, an SCSI interface utilizes an inter-locked bus design that allows for a relatively high degree of predictability on data transfers. In particular, once a device on an SCSI interface arbitrates and gains control of the bus, data may be instantaneously transferred from one device to the other device. Therefore, generally the only variable that needs to be considered when calculating the optimal time to start the host engine on a transfer, e.g., the adaptive ratios, aside from the respective engine speeds, is the amount of time it takes to gain control of the bus. Therefore, using a worst case bus workload scenario, the amount of time required to gain control of the bus can be calculated and used to represent all other workload cases. This amount of time is relatively constant and with minimal padding can be set so as to generally avoid a drive catch-up condition, while also minimizing the number of host catch-ups conditions. Since the calculated worst case time to gain control of the bus generally remains constant for writes or reads and generally does not vary from system to system, this approach is generally effective for SCSI based devices.

Alternatively, FC-AL interfaces have a number of variables that contribute to the calculation of the adaptive ratio. As such, FC-AL interfaces are substantially less predictable than SCSI interfaces. For example, on an FC-AL loop, the ability to arbitrate for control of the loop generally depends upon factors such as the loop traffic and the number of ports present on the loop. Therefore, on a busy loop with a large number of ports, the delay required to arbitrate for control of the bus could easily be several milli-seconds. Additionally, in an FC-AL configuration data is not instantaneously transferred between devices on a loop, as there is some finite delay between the time when one device sends data and another device actually receives the data. This delay generally increases as the loop size grows, and therefore, increases substantially if there is an interstitially positioned fabric. Furthermore, FC-AL includes unique handling procedures for write data, as the drive sends a Transfer Ready frame when it is ready to begin receiving write data frames. The drive, however, has no control over when the receiver of the Transfer Ready frame will turn around and begin sending these data frames. This turn around time varies from adaptor to adaptor and from system to system, and therefore, further contributes to making it increasingly difficult to calculate the adaptive ratios for an FC-AL type system.

Therefore, in view of the deficiencies of conventional methods for adjusting the adaptive ratios for an FC-AL based configuration, there exists a need for a method and/or apparatus for dynamically calculating adaptive ratios in FC-AL based systems. In particular, there is a need a method and/or apparatus for dynamically calculating the adaptive ratios for a hard disk drive resident in an FC-AL type interface. The method and apparatus would preferably be configured to account for the large amount of variability in a FC-AL interface and dynamically calculate adaptive ratios based upon current and previous interface conditions.

SUMMARY OF THE INVENTION

Embodiments of the present invention provide a method for dynamically adjusting engine startup parameters for a hard disk drive system, wherein the method includes determining if a drive catch-up or a host catch-up condition has occurred and adjusting at least one of a read pad and a write pad if a drive catch-up condition is determined. Further, the method includes calculating a pad parameter and an optimal delay parameter if a host catch-up condition is determined, and thereafter, adjusting the optimal delay parameter with the pad parameter.

Embodiments of the present invention further provide a method for dynamically adjusting buffer ratios in an fiber channel arbitrated loop-based hard disk drive system. The method includes increasing a drive pad parameter if a drive side catch-up is determined. Alternatively, if a host catch-up is determined, the method includes calculating a host pad parameter, calculating an optimal interrupt logical block address, and calculating an adjustment parameter. Thereafter, the method includes adjusting the optimal interrupt logical block address with the adjustment parameter, and modifying the adjusted optimal interrupt block address with the host pad parameter.

Embodiments of the present invention further provide a computer readable medium storing a software program thereon, that when executed by a processor, causes the processor to perform a method including the steps of determining if a drive catch-up or a host catch-up condition has occurred and adjusting at least one of a read pad and a write pad if a drive catch-up condition is determined. The method further includes calculating a pad parameter and an optimal delay parameter, and then adjusting the optimal delay parameter with the pad parameter if a host catch-up condition is determined.

Embodiments of the present invention further provide a computer readable medium storing a software program thereon, that when executed by a processor, causes the processor to dynamically adjusting buffer ratios. The method includes increasing a drive pad parameter if a drive side catch-up is determined. Alternatively, if a host catch-up is determined, the method includes calculating a host pad parameter, calculating an optimal interrupt logical block address, and calculating an adjustment parameter. Thereafter, the method includes adjusting the optimal interrupt logical block address with the adjustment parameter, and modifying the adjusted optimal interrupt block address with the host pad parameter.

BRIEF DESCRIPTION OF THE DRAWINGS

So that the manner in which the above recited features and embodiments are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

A general solution to the difficulties associated with dynamically calculating adaptive ratios for a hard disk drive resident in an FC-AL type interface is to dynamically maintain at least one variable that may be used to control memory buffer usage. A first dynamically adjusted variable may represent a number of memory blocks read into a memory buffer by a drive side engine compared to the number of memory blocks currently residing in the memory buffer designated for transfer by a host side. This variable, which may be termed a Read Buffer Pad, may therefore be used to determine an optimal point in time where the host engine should start/restart transferring read data so that the drive side engine does not stall and/or enter into a catch-up condition during the transfer of data into and out of the buffer. A second dynamically adjusted variable, which may be termed the Write Buffer Pad, may represent the difference between the number of memory blocks read into the memory buffer by the drive side engine compared to the number of memory blocks remaining in the memory buffer for transfer by the host side engine. This variable may be used to determine the optimal point at which the host side engine should request more data to be written in to the memory buffer so that the drive side engine does not enter into a catch-up condition. These two variables are generally needed since the time to restart the host side transfer for reads can be significantly less than the amount of time to request and receive data for writes.

Figure 1:
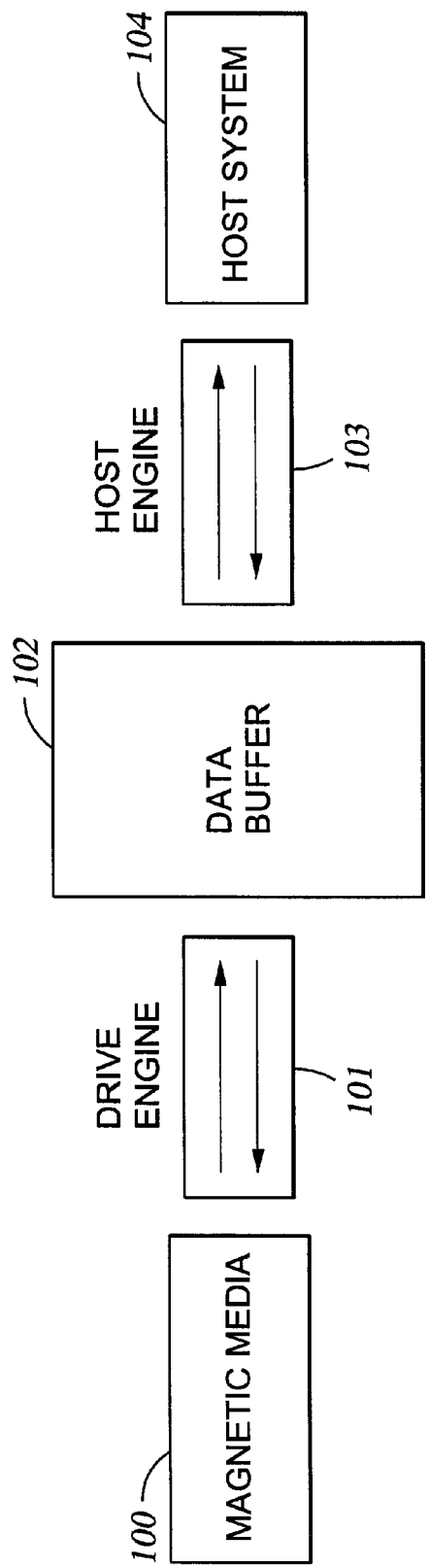
FIG. 1 illustrates a conventional hard disk drive engine configuration.
Figure 2:
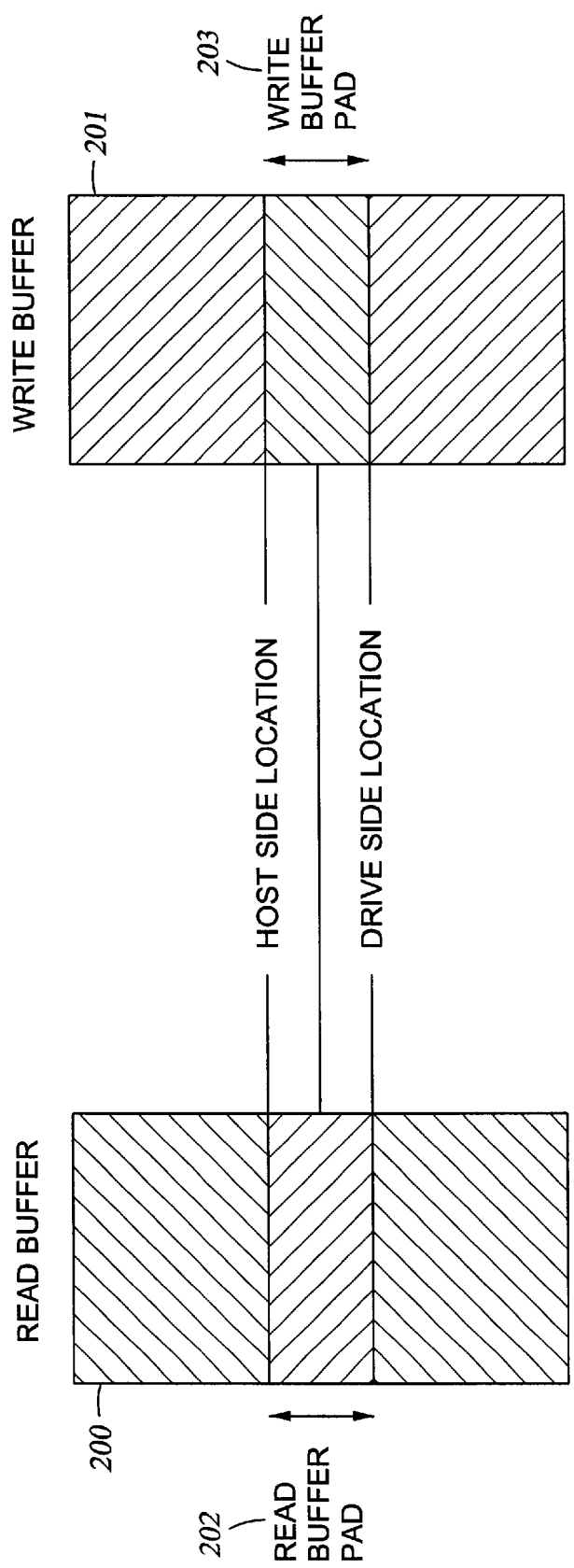
FIG. 2 illustrates exemplary buffers of the present invention.

The dynamic maintenance of the two variables may be configured so that the drive side engine does not stop transferring data until it has reached the end of the command, which will minimize drive side catch-ups. FIG. 2 is presented as an exemplary illustration of hard disk drive data buffers prior to a host side engine being re-started for both a Read command case and a Write command case. The exemplary illustration of FIG. 2 assumes that respective buffers wrap from top to bottom. Therefore, for a read command, FIG. 2 illustrates how the read buffer 200 will fill up with data from the media. At the point where the drive side reaches the read buffer pad delta 202 from the host side location, the host side should begin transferring data to the host system. For a write command case, FIG. 2 illustrates the drive side engine emptying the read buffer 200 as it writes data to the media. Therefore, at the point where the drive side reaches the write buffer pad delta 203 from the host side location, the host side should begin requesting more data to write from the host system.

The respective pads 202, 203 may be dynamically adjusted during read/write operations, wherein the adjustments may be based upon current network condition as well as the success or failure of the previous pad settings. In order to accomplish this type of dynamic adjustment taking into account previous statistical information, separate statistical counters, as are known in the art, may be used to track and/or record statistical information relative to the configuration. For example, the statistical counters may be used to track and/or record parameters such as the number of host-catch-ups and the number of drive catch-ups for both read and write operations, the number of times the host side engine begins a data transfer, along with various other FC-AL related parameters. Separate variables may also track/record the host side and drive side locations in the buffer during the previous catch-up condition.

Figure 3:
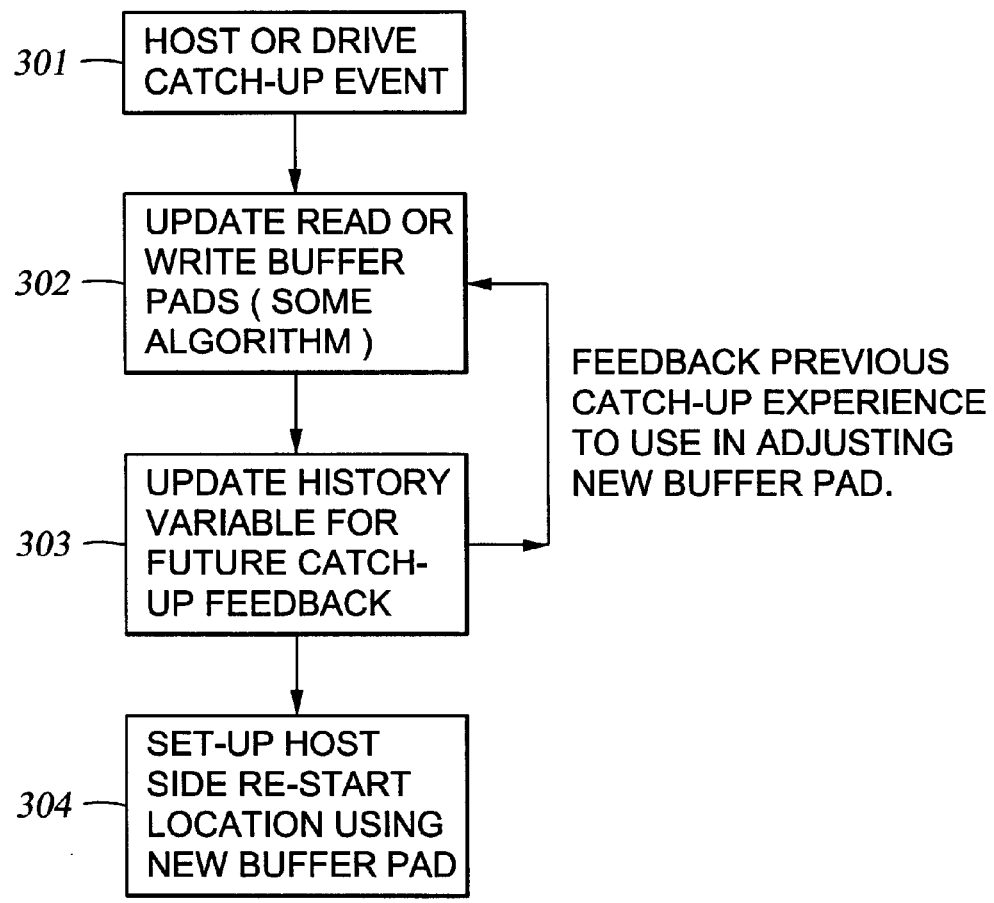
FIG. 3 illustrates an exemplary flow diagram of a control/adjustment process of the present invention.

The dynamic adjustment of the Read Buffer Pad 202 and the Write Buffer Pad 203 will generally be conducted upon occurrence of catch-up condition. FIG. 3 illustrates a general flow diagram of how a control/adjustment process may utilize feedback from the previous history of catch-up events to adjust the current read/write buffer pads for optimal operation. The flow begins at step 301 when a catch-up event occurs in a hard disk drive. When the catch-up condition occurs, the control process updates the respective read and write buffer pads for operation that is calculated to avoid encountering a future catch-up condition under the circumstances that caused the present catch-up condition at step 302. The process is further configured to record the parameters and conditions of the hard disk drive system that caused the present catch-up condition at step 303. This information may be then be used in the updating process of step 302 upon encountering the next catch-up condition. Once the respective pads are updated, the process sets up the host side restart location using the updated pad at step 304.

Various algorithms may be implemented within step 302 of the process flow shown in FIG. 3 in order to update the respective buffer pads. For example, a simple algorithm for adjusting either the Read Buffer Pad or the Write Buffer Pad calculated to increase the appropriate pad by predetermined constant, i.e., 10 blocks, when a catch-up condition occurs. In this type of a configuration and implementation the adjustment constants may be weighted heavier for drive catch-up conditions than for host catch-up conditions due to the severity of the performance penalty for a write catch-up.

Alternatively, step 302 may be configured to calculate the number of blocks between the current host catch-up location and the previous host catch-up location if a host catch-up condition occurs. If there was no previous host catch-up condition for the current transfer, then the number of blocks between the current host catch-up location and the starting block of the current transfer may be calculated. If this delta-type calculation is greater than a predetermined threshold, i.e., the total buffer size in blocks, then no adjustment may be required and the host engine may simply be restarted. In this case, it is essentially determined that the current ratios/pads are already set at an efficient value and are tuned for the current system or workload. If, for example, the delta calculation is greater than a smaller predetermined threshold, i.e., 80% of the total buffer size in blocks, then the Read Buffer Pad may be decremented by a predetermined number of blocks, one block for example, and the host engine restarted. If, for example, the delta calculation is greater than some even smaller threshold, i.e., 60% of the total buffer size in blocks, then the Read Buffer Pad may be decremented by 2 blocks, for example, and the host engine restarted. Additional levels having increasingly weighted adjustments may be added as necessary to tune and optimize the system.

Although host catch-up conditions, which may be termed "desired catch-up conditions" if they correspond to a catch-up at the end of a segment transfer, are expected in the present exemplary embodiment, these catch-up conditions may serve to provide fine-tune adjustments for the system. However, as noted above, the predetermined parameters may be weighted against drive catch-up conditions as a result of the substantially greater performance degradation associated with drive catch-up conditions.

An exemplary method of the present invention may include two primary logic flows; first, a logic flow to handle drive catch-up conditions; and second, a logic flow to handle host catch-up conditions. The logic flow for the host catch-up conditions may further include a logic flow configured to handle write catch-up conditions and a logic flow to handle read catch-up conditions. Each of the host catch-up logic flows may include an individual logic flow configured to calculate and/or adjust a parameter/ratio that is related to optimal starting point of the respective engine.

Figure 4:
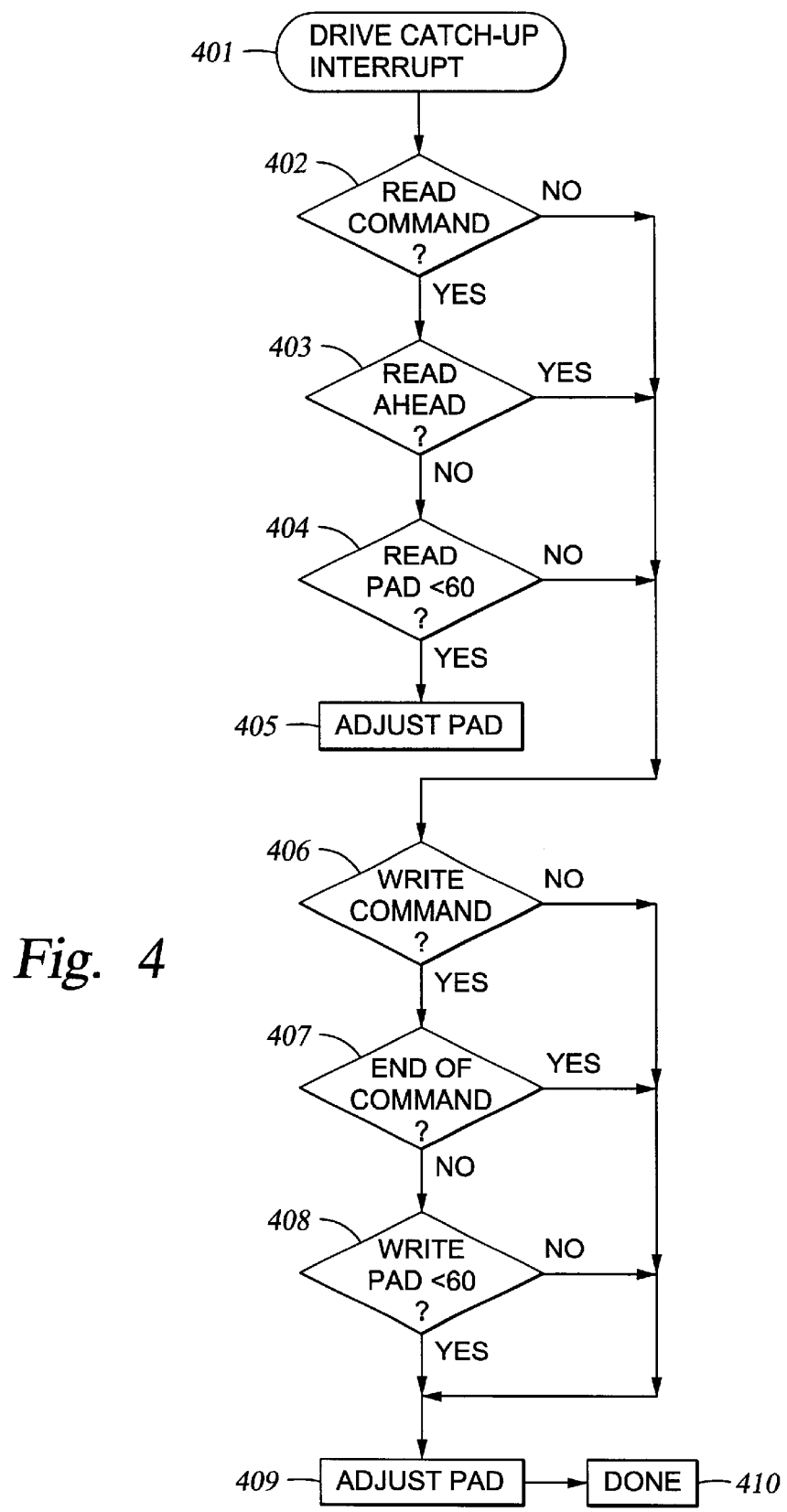
FIG. 4 illustrates an exemplary flow diagram of the present invention for a drive catch-up condition.

FIG. 4 illustrates an exemplary logic flow of the present invention for dealing with a drive catch-up condition. At step 401 a drive catch-up interrupt is generated upon the occurrence of a drive catch-up condition. The logic determines if the catch-up condition occurred upon execution of a read command at step 402, and if a determination is made that the catch-up occurred on a read command, then the method continues to step 403. Step 403 determines if the system is in a read-ahead condition, wherein read-ahead may be generally defined as the condition where the system is reading data that is not part of the requested command. If a read-ahead condition is not determined at step 403, then the logic continues to step 404, where the logic determines if a read pad parameter is less than a predetermined quantity, which is 60 in the present exemplary flow diagram. If the read pad is determined to be less than the predetermined number, which is essentially a boundary test, then the logic continues to step 405, where the read pad is adjusted by a predetermined number. The predetermined number, which is ten memory blocks in the present exemplary method, is calculated as an aggressive increase in the read pad so that further drive catch-up conditions may be avoided.

Each of the alternative decision routes from steps 402, 403, and 404 lead to step 406 where the method determines if the catch-up condition occurred on a write command. If the catch-up condition is determined to have occurred on a write command, then the method determines if the catch-up condition occurred at the end of the particular write command at step 407. For example, in the present exemplary method, step 407 may determine if the catch-up condition occurred on a drive side compete-type (DCMP) command, which signifies the end of the write command. If step 407 determines that the catch-up condition did not occur at the end of a write command, which indicates that the catch-up condition occurred in the middle of a write command, then the exemplary method then determines if the write pad is less than a predetermined number, which may again be 60, for example, at step 408. If the write pad is determined to be less than 60, then the method continues to step 409, where the write pad is increased by a predetermined number, which may again be ten memory blocks, for example. Thereafter, the method continues to step 410, which indicates the completion of the pad adjustment process for a drive catch-up condition.

Figure 5A:
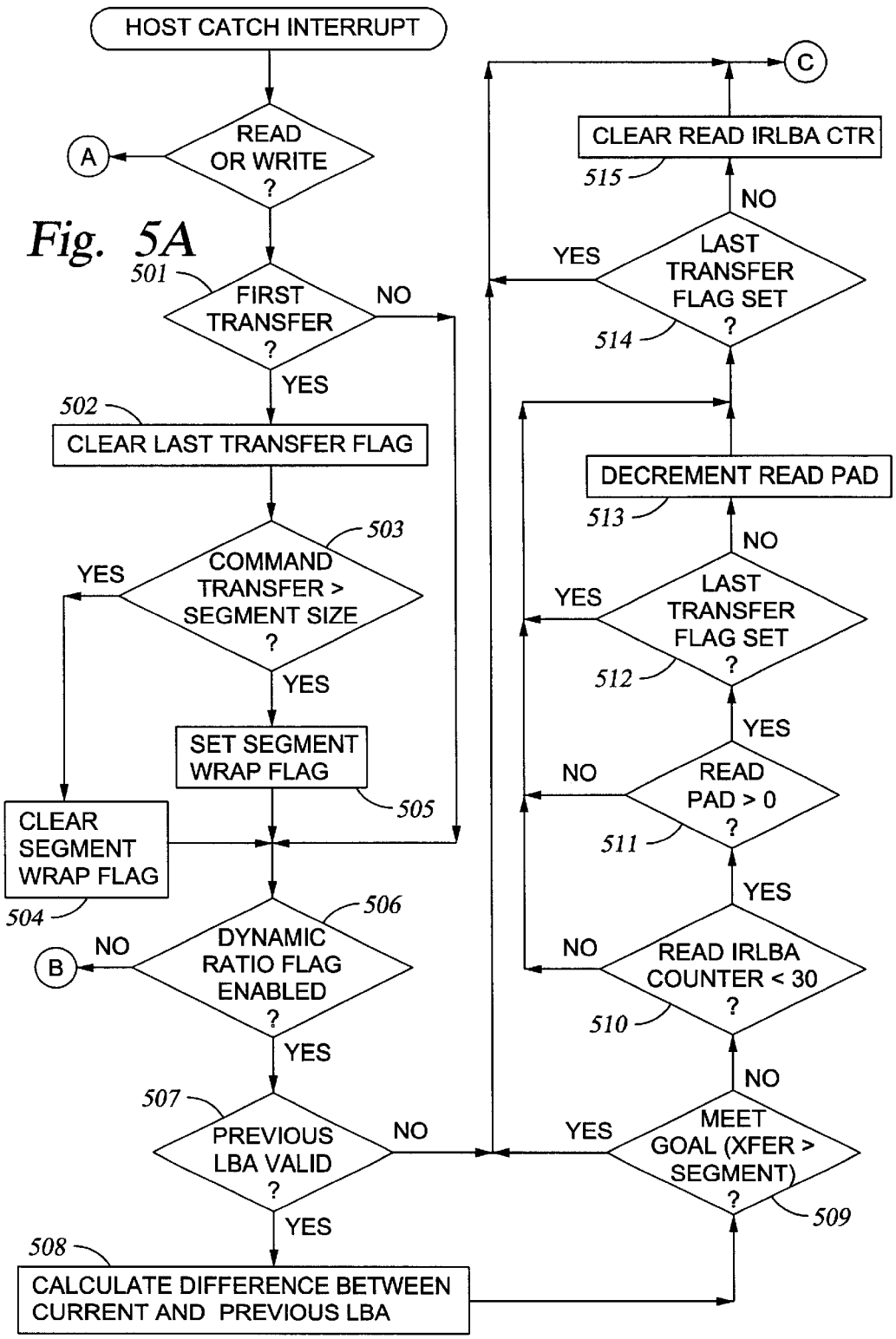
FIGS. 5A and 5B illustrate an exemplary flow diagram of the present invention for a host read catch-up condition.
Figure 5B:
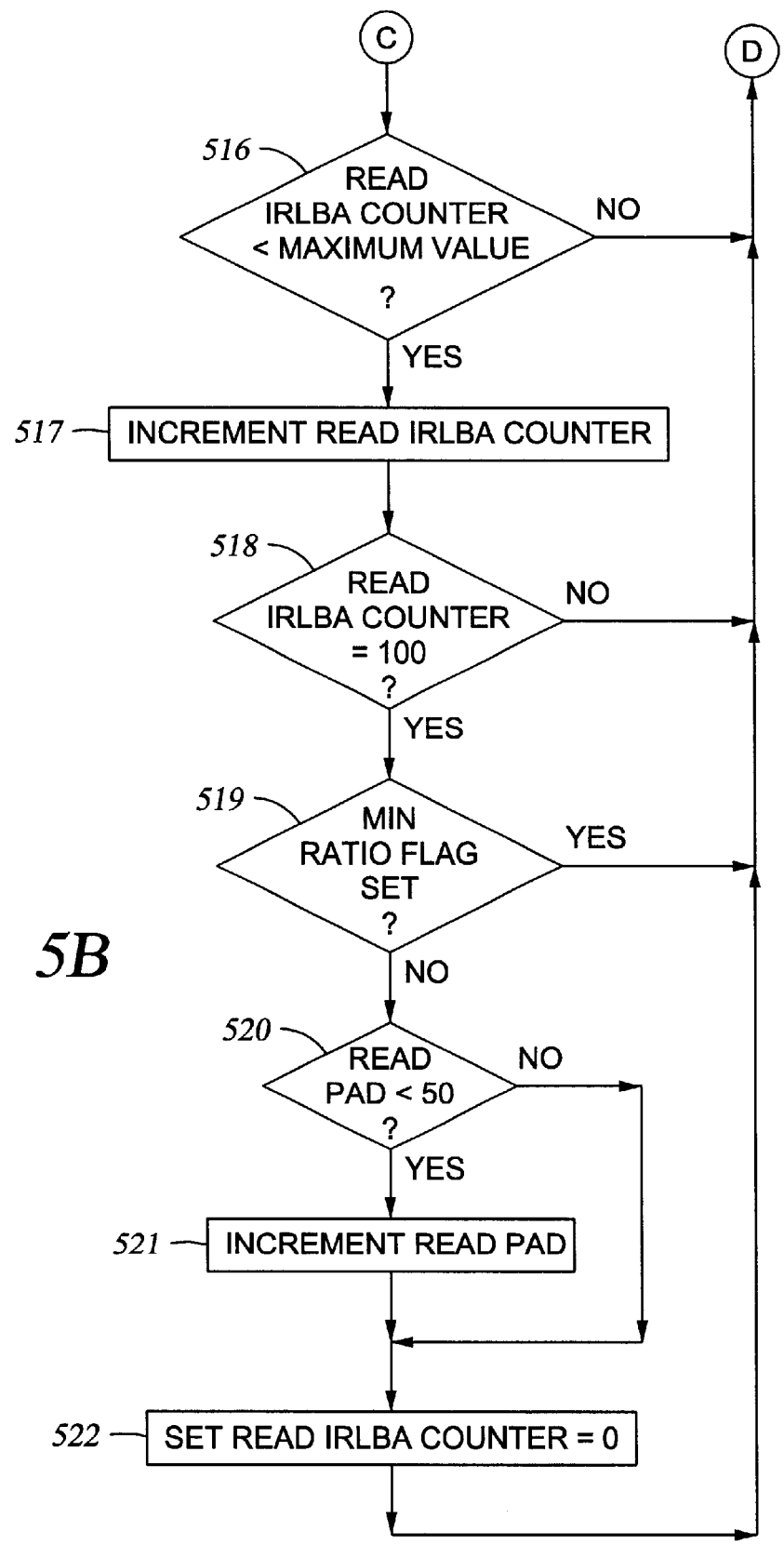

FIGS. 5A and 5B operatively illustrate the flow logic for a host catch-up condition on a read command. Once it is determined that a host catch-up has occurred on a read command at step 500, the method continues to step 501 where it is determined if the current transfer upon which the catch-up condition occurred is the first transfer forte respective read command. If it is determined that the catch-up condition occurred on the first transfer, en the method continues to step 502 where the method clears a last transfer flag that represents whether or not the last transfer has occurred, and then continues to step 50. At step 503 the method determines if the command transfer is greater than the segment size. If the method determines that the command transfer is greater than the segment size then the method continues to step 505, and it not, then the method continues to step 504. Step 504 operates to clear a flag that indicates whether or not the current command is a segment wrap-type command and then continues to step 506. Generally, a segment wrap-type command represents a command that has a transfer lager than the current segment size. As such, if step 503 determines that the current command transfer is greater than a segment size, then the method knows that the current command is a multisegment command, and therefore, sets the appropriate flag designating such in step 505. If the current command is less than a segment size, then the method knows that the current command is a relatively short command, and therefore dears the segment wrap flag so that subsequent steps will know to treat this command as a short and easily processed command. The combination of steps 501–05 generally include steps necessary to initialize the method of the present invention. However, the addition and/or subtraction of initialization steps from the pre ant exemplary method is contemplated within the scope of the present invention.

Once the appropriate initialization steps are complete, then the method continues to step 506 where it is determined if a dynamic ratio flag/function for the respective hard disk drive system is enabled. This flag may operate to disable the present method if desired by the user. If the dynamic ratio flag is not enabled then the method skips over all of the pad and counter adjustments directly to step 605 in FIG. 6. If the dynamic ratio is enabled, then the method continues to step 507 where it is determined if a previous logical block address (LBA) is valid. Generally, if the present catch-up condition is the first host read catch-up, then there will not be a previous LBA, and therefore, if the previous LBA is determined to be not valid at step 507, the method skips to step 516 in FIG. 5B. If the previous LBA is determined to be valid at step 507, then the method continues through steps 508–515, where the LBA may be adjusted.

Step 508 generally represents the beginning of the LBA setup/adjustment process. At step 508 the present method calculates the difference between a current LBA and a previous LBA. Thereafter, the method determines if the method achieved a desired goal on the most recent previous catch-up condition by determining if the transfer is greater than the segment size. If the transfer is determined to be greater than the segment size, then the previous goal was met and the logic kicks out of the adjustment line of steps and skips down to step 516 in FIG. 5B without adjustment, as the system met the previous goal. If the transfer is determined not to be greater than the segment size, then the method continues to step 510 where it is determined if the current read interrupt logical block address (IRLBA) counter is less than 30. If the IRLBA counter is determined to be less than 30, then the method continues to step 511, where the method determines if a read pad is greater than zero. If the read pad is determined to be greater than zero, then the method continues to step 512 where it is determined if a last transfer flag is set, which indicates that the current transfer is the last transfer for a particular command. If the last transfer flag is determined to be set, then the method may decrement the read pad by, one memory block, for example, at step 513.

Step 514, which is the continuing step for step 513 and for the alternative decision on each of steps 510–512, determines if the last transfer flag is set, in similar fashion to step 512. However, since the last transfer flag will not be checked if the method kicks out at either one of steps 510 and 511, the flag is again checked at step 514. If the at transfer flag is determined not to be set, then the method continues to step 51 where a read IRLBA counter is cleared. If the last transfer flag is determined to beset at step 514, then the method continues to step 516 in FIG. 5B where the method determines if the read IRLBA counter is less than a predetermined maximum value. If the read IRLBA counter is determined to be less than a predetermined maximum value, then the method continues to step 517 where the read IRLBA counter is incremented, by one unit, for example.

After incrementing the read IRLBA counter, the method continues through FIG. 5B to step 518 where the method determines if the read IRLBA counter equals 100. If the read counter is determined to equal 100, then the method continues to step 519, where it is determined if a minimum ratio flag is set. This flag generally indicates that there is less than a full segment of data left to be transferred, and therefore, the method wants to get the host side engine started transferring data as soon as possible. If the minimum ratio flag is determined not to be set, then the method continues to step 520 where it is determined if the read pad is less than a predetermined number, which may be 50, for example. If the read pad is determined to be less than the predetermined number at step 520, then the method may increment the read pad at step 521. Thereafter, the method may complete the pad and counter adjustment process illustrated in steps 513–521 by setting the read IRLBA to zero at step 522. The alternative to determination steps 516, 518, and 519, as well as the continuation for step 522, is the calculation of the optimal ratio value, which is shown in FIG. 6 beginning with step 601.

Figure 6:
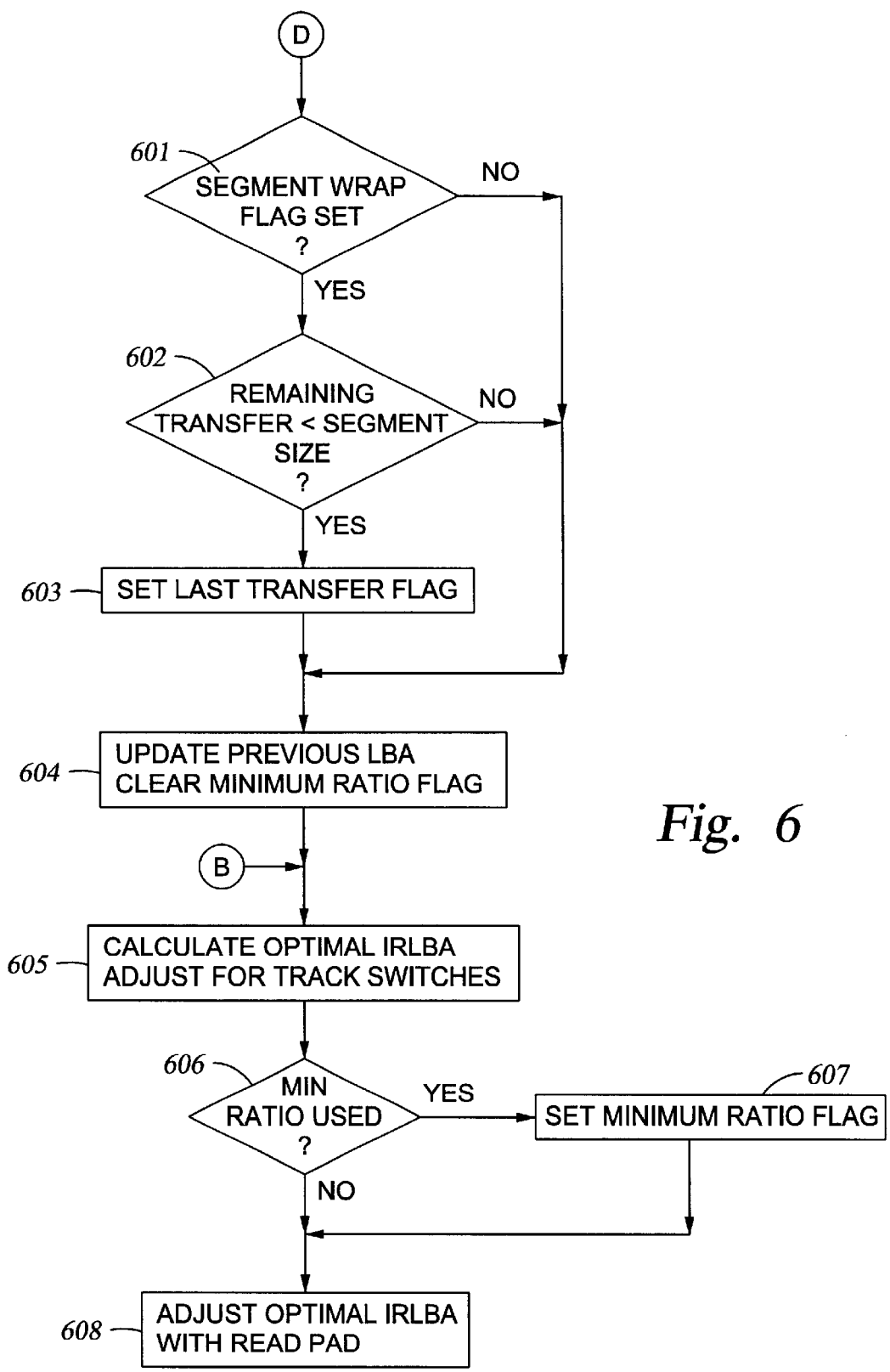
FIG. 6 illustrates an exemplary flow diagram of the calculation of an optimal ratio for a host read catch-up in the present invention.

FIG. 6 generally illustrates an exemplary flow logic for calculating an optimal ratio value for a hard disk drive system. The calculation flow begins with step 601 where it is determined if the segment wrap flag is set. If the segment wrap flag is determined to be set, then the logic continues to step 602 where it is determined if the remaining transfer is less than the segment size. If the remaining transfer is determined to be less than the segment size, then a last transfer flag is set at step 603 before the method continues to step 604. If either of the determinations in steps 601 or 602 are negative, then each of these steps continues directly to step 604 without setting the last transfer flag. At step 604 the method updates the previous LBA and clears a minimum ratio flag before continuing to step 605. This flag operates to set up a minimal delay in order to get the host side processing as soon as possible in the condition where there is only a minimal portion of data left to transfer, i.e., where the data remaining less than a segment. At step 605 the exemplary method calculates an optimal IRLBA via standard methods and adjusts for track switch related delays in the drive side before continuing to step 606. At step 606 the method determines if the minimum ratio was used, and if so, sets the minimum ratio flag at step 607 and continues to step 608. If the minimum ratio is not used and determined at step 606, then the method continues to step 608, where the optimal IRLBA is adjusted with the value of the read pad.

Figure 7A:
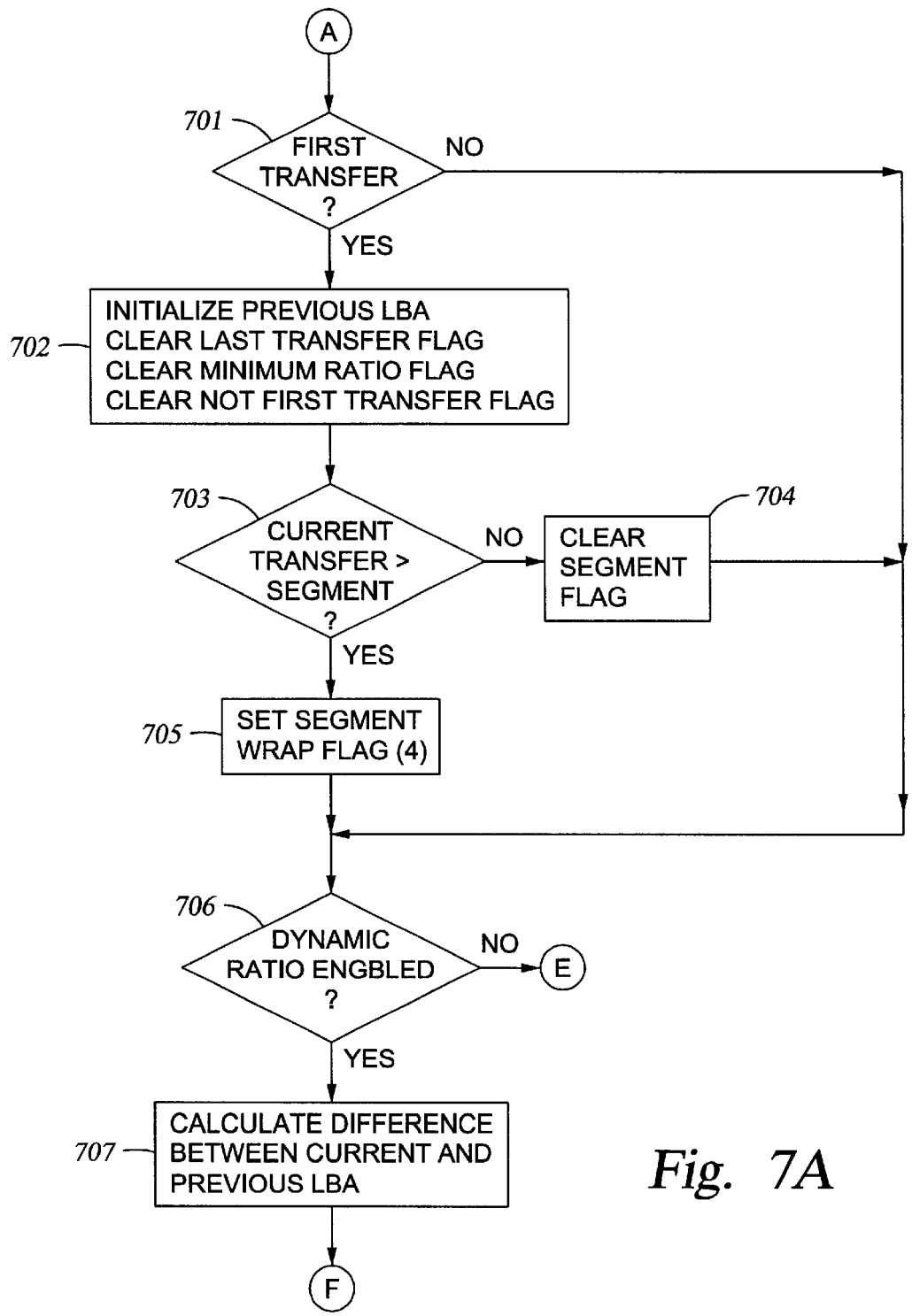
FIGS. 7A and 7B illustrate an exemplary flow diagram of the present invention for a host write catch-up condition.
Figure 7B:
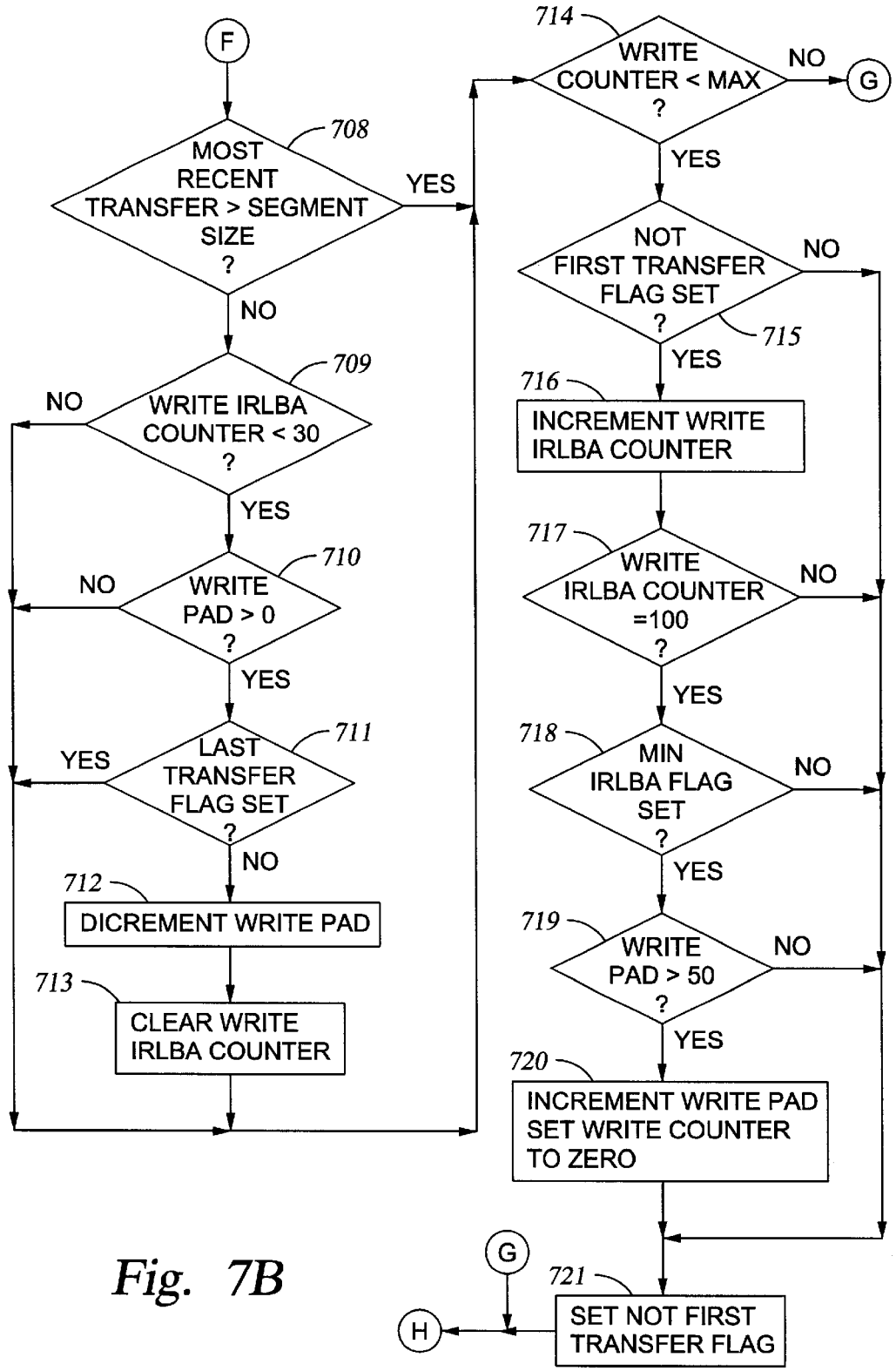

FIGS. 7A and 7B operatively illustrate an exemplary flow diagram of the method of the present invention for handling a host side write catch-up situation. The method begins at step 701 in FIG. 7A where it is determined if the current transfer is the first transfer. If it is determined that the current transfer is the first transfer, then the method continues to step 702. If it is determined that the current transfer is not the first transfer, then the method continues to step 706, skipping over steps 702–705. Step 702 initializes the previous LBA, clears a last transfer flag, clears the minimum ratio flag, and clears a flag that indicate that it is not the first transfer before proceeding to step 703. At step 703 the present method determines if the current transfer is greater than the segment size. If the current transfer is determined to be greater than the current segment size, then the method continues to step 705 where the segment wrap flag is set. If the current transfer is determined not to be greater than the segment size, then the method continues to step 704, where the segment wrap flag is cleared. As such, steps 701–705 generally operate to initialize the method for handling a host side write catch-up condition.

Once the initialization process is complete, the method continues to step 706 where it is determined if the dynamic ratio is enabled. If the dynamic ratio is not enabled, which indicates that the user may have disabled the functionality of the present invention, then the method continues to step 805 in FIG. 8. If the dynamic ratio is determined to be enabled, then the method continues to step 707 where the difference between the current and previous LBA is calculated. Once the difference between the LBAs is calculated the method continues to step 708 in FIG. 7B where it is determined if the method met the previous goal, which corresponds to determining if the most recent transfer is greater then the segment size. If the most recent transfer is determined not to be greater than the segment size, then the method continues to step 709 where it is determined if the write IRLBA counter is less than 30. If the write IRLBA counter is determined to be less than 30, then the method continues to step 710 where it is determined if the write pad is greater than zero. If it is determined that the write pad is greater than zero, then the method continues to step 711 where it is determined if the last transfer flag is set. If the last transfer flag is not set, then the write pad is decremented at step 712.

If the determination is step 708 indicates that the previous transfer met the desired goal, then the method continues to step 714. Additionally, if either of determining steps 709–711 are determined in the opposite manner as described above, then each of these steps will continue to step 713. Step 713 clears the write IRLBA counter and continues to step 714, where it is determined if the write counter is less than a maximum parameter that may be set by the user. If the write counter is determined to be less than the maximum parameter, then the method continues to step 715, where it is determined if the not a first transfer flag is set. If the not a first transfer flag is set then the method continues to step 716 where in the write IRLBA counter is incremented, before continuing to step 717. If the write counter is determined not to be less than the maximum parameter at step 714, then the method continues to step 801, which will be discussed with respect to FIG. 8. At step 717, the method determines if write IRLBA counter equals 100, and if so, further determines if the minimum IRLBA flag is set at step 718. If the minimum IRLBA flag is set, then the method continues to step 719 where it is determined if the write pad is less than 50. If the write pad is determined to be less than 50, then the write pad is incremented and the write counter is set to zero at step 720. Thereafter, the not first transfer flag may be set at step 721. Additionally, if any of the determining steps, e.g., steps 715, and 717–719, determine that the result is negative, then each of these steps continues directly to step 721 and sets the not first transfer flag. Once the not first transfer flag is set in step 721, which concludes the incrementing of the pad to obtain a less aggressive start time so that subsequent host write catch-ups may be avoided along with maintaining the read pad as close to a desired goal as possible, the method continues to step 801 in FIG. 8.

Figure 8:
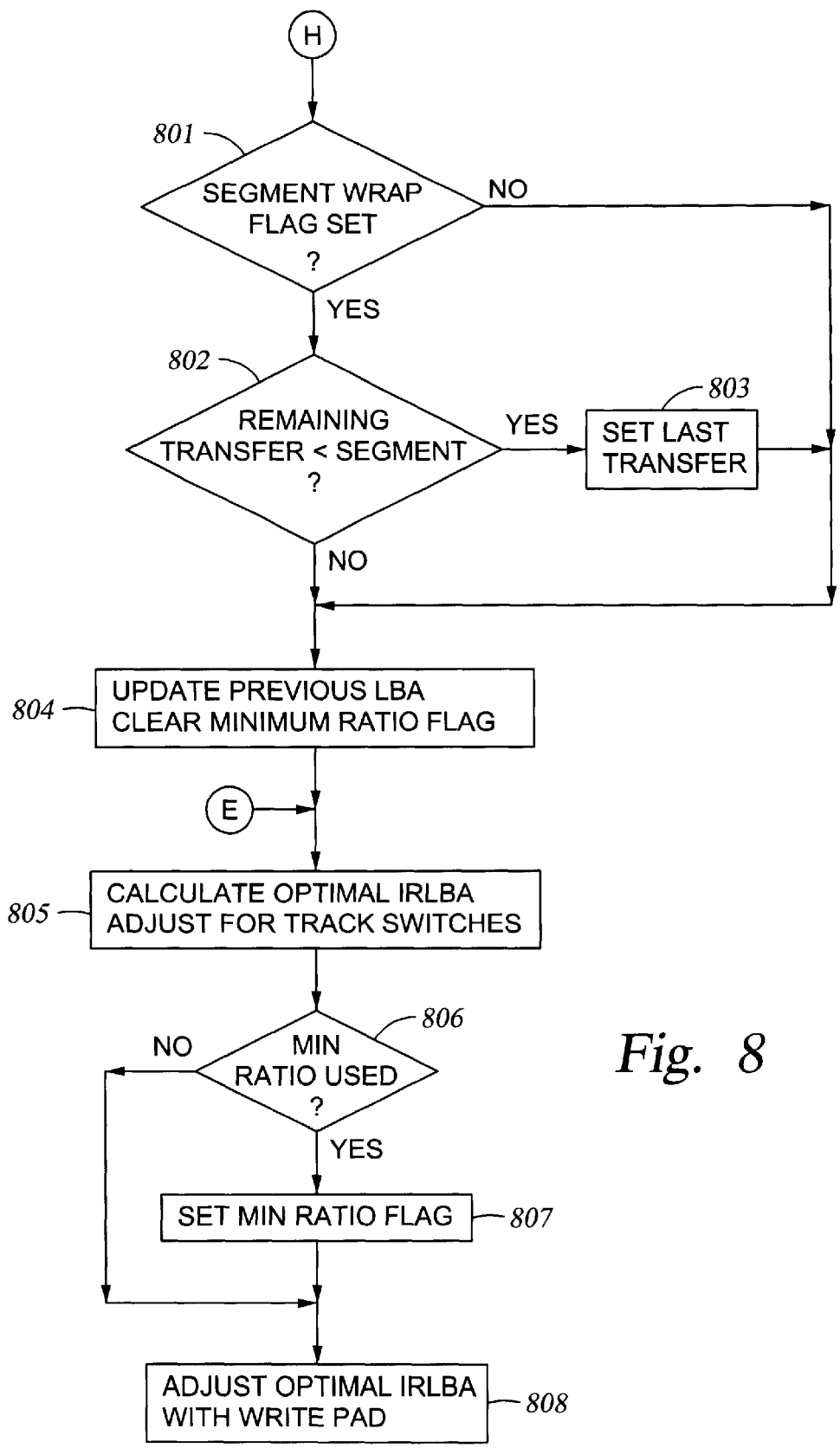
FIG. 8 illustrates an exemplary flow diagram of the calculation of an optimal ratio for write host catch-up condition.

FIG. 8 generally represents the process associated with calculating the appropriate ratios for the hard disk drive and adjusting the calculated ratios with calculated adjustment parameters. The method illustrated in FIG. 8 begins with step 801, where it is determined if the segment wrap flag is set. If the flag is determined to be set, then the method continues to step 802 where it is determined if the remaining transfer is less than the segment size. If it is, then the last transfer flag is set at step 803, and if it is not determined, then the method continues to step 804, where the previous LBA is updated and the minimum ratio flag is updated. Thereafter, the method continues to step 805, where the optimal IRLBA is calculated and then adjusted to track switch delays. Once the optimal IRLBA is calculated and adjusted for track switch delays, the method continues to step 806, where it is determined if the minimum ratio was used. If the minimum ratio was used, then the method continues to step 807 where minimum ratio flag is set before proceeding to step 808. Step 808, which also is subsequent to step 806 if the minimum ratio is determined not to be used, adjusts the optimal IRLBA with the write pad to generate an optimal ratio parameter.

A host catch-up condition may be defined as the situation in which host data transfer engine must pause since it has reached the LBA in buffer in which the drive engine is still transferring data out of. A drive catch-up may be defined as the situation in which the drive side engine must pause because it has reached the LBA in the buffer in which the host engine is still transferring data into. Again, drive side catch-up conditions are to be avoided and/or eliminated as a result of the substantial performance penalty associated therewith. Additionally, the system should be designed to minimize the occurrence of host catch-ups.

As a result of the method outlined in FIGS. 4–8, the parameters associated with the start times for the respective engines in a hard disk drive are dynamically maintained at an optimal level. The optimal level is calculated using both the physical characteristics of the hard disk drive and the timing characteristics inherent in FC-AL type configurations. The method determines whether to dynamically update the relevant parameters, i.e., the adaptive ratio, LBA parameters, and/or pad parameters, every time the hard disk drive encounters a catch-up condition, whether or not the catch-up condition is a desired catch up condition or an undesired catch up condition.

While the foregoing is directed to the preferred embodiment of the present invention, other and further embodiments of the invention may be devised without departing from the basic scope thereof, and the scope thereof is determined by the claims that follow.

What is claimed is:

1. A method for dynamically adjusting engine startup parameters for a hard disk drive system, comprising:

determining if at least one of a drive catch-up condition and a host catch-up condition has occurred;

adjusting at least one of read pad and a write pad if a drive catch-up condition is determined;

decrementing a read pad parameter if a previous pad parameter goal was unsuccessful and at least one boundary condition is satisfied for a host read catch-up condition, and decrementing a write pad parameter if a previous pad parameter goal was unsuccessful and at least one boundary condition is satisfied for a host write catch-up condition, decrementing the read pad and write pad further comprising calculating a difference between a current logical block address and a previous logical block address; and determining if a previous goal was met during a transfer that results in a current catch-up condition;

incrementing the pad parameter if a counter equals a predetermined number and at least one boundary condition is not satisfied;

calculating an optimal delay parameter if a host catch-up condition is determined; and adjusting the optimal delay parameter with the pad parameter if a host catch-up condition is determined.

2. The method of claim 1, wherein the incrementing step further comprises incrementing a read pad if the catch-up condition is a host read catch-up and incrementing a write pad if the catch-up condition is a host write catch-up.

3. The method of claim 1, wherein incrementing the write pad if the catch-up condition is a host write catch-up further comprises:

incrementing a write counter; and determining if at least on boundary condition is satisfied.

4. The method of claim 1, wherein incrementing the read pad if the catch-up condition is a host read catch-up further comprises:

incrementing a read counter; and determining if at least on boundary condition is satisfied.

5. The method of claim 1, wherein calculating an optimal delay parameter further comprises:

updating a previous logical block address;

calculating an optimal interrupt logical block address; and adjusting the calculated optimal interrupt logical block address for track switch delays.

6. The method of claim 1, wherein adjusting the optimal delay parameter with the pad parameter further comprises adding the adjusted optimal interrupt logical block address to the calculated pad parameter.

7. A computer readable medium storing a software program that, when executed by a processor, causes the processor to perform a method comprising:

determining if at least one of a drive catch-up condition and a host catch-up condition has occurred;

adjusting at least one of a read pad and a write pad if a drive catch-up condition is determined;

calculating a pad parameter if a host catch-up condition is determined, wherein calculating the pad parameter comprises:

decrementing a read pad if the catch-up condition is a host read catch-up and decrementing a write pad if the catch-up condition is a host write catch-up, the decrementing step occurring if previous pad parameter goal was unsuccessful and at least on boundary condition is satisfied; and incrementing the pad parameter is a counter equals a predetermined number and the boundary condition is not satisfied;

calculating an optimal delay parameter if a host catch-up condition is determined; and adjusting the optimal delay parameter with the pad parameter if a host catch-up condition is determined, wherein decrementing the read pad includes calculating a difference between a current logical block address and a previous logical block address, and determining if a previous goal was met during a transfer that results in a current catch-up condition.

8. The computer readable medium of claim 7, wherein the method of determining if a host catch-up condition has occurred further comprises determining at least one of a host read catch-up condition and a host write catch-up condition.

9. The computer readable medium of claim 7, wherein the method of incrementing the write pad if the catch-up condition is a host write catch-up further comprises:

incrementing a write counter; and determining if at least one boundary condition is satisfied.

10. The computer readable medium of claim 7, wherein the method of incrementing the read pad if the catch-up condition is a host read catch-up further comprises:

incrementing a read counter; and determining if at least one boundary condition is satisfied.

11. The computer readable medium of claim 7, wherein the method of calculating an optimal delay parameter further comprises:

updating a previous logical block address;

calculating an optimal interrupt logical block address; and adjusting the calculated optimal interrupt logical block address for track switch delays.

12. The computer readable medium of claim 7, wherein the method of adjusting the optimal delay parameter with the pad parameter further comprises adding the adjusted optimal interrupt logical block address to the calculated pad parameter.

* * * * *